United States Patent [19]

Fréchet et al.

[11] Patent Number: 5,656,694
[45] Date of Patent: Aug. 12, 1997

[54] INTERPOLYMER CURES OF BLENDS COMPRISING HALOGENATED ISOOLEFIN/PARA-ALKYLSTYRENE ELASTOMERS AND UNSATURATED ELASTOMERS

[75] Inventors: Jean M. J. Fréchet, Ithaca, N.Y.; Dongming Li, Houston, Tex.; Kenneth William Powers, Berkeley Heights, N.J.; Hsien-Chang Wang, Bellaire, Tex.; Donald Andrew White, Keasbey, N.J.

[73] Assignee: Exxon Chemical Patents Inc., Wilmington, Del.

[21] Appl. No.: 433,773

[22] Filed: May 3, 1995

[51] Int. Cl.⁶ .................. C08L 9/00; C08L 15/02
[52] U.S. Cl. ............ 525/195; 525/209; 525/232; 525/235
[58] Field of Search .................. 525/195, 209, 525/232, 235

[56] References Cited

U.S. PATENT DOCUMENTS

| | | | |
|---|---|---|---|
| 5,063,268 | 11/1991 | Young | 525/333.4 |
| 5,376,438 | 12/1994 | Costemalle | 525/354 |
| 5,385,459 | 1/1995 | Graves | 525/233 |
| 5,397,837 | 3/1995 | Arjunan | 525/209 |

FOREIGN PATENT DOCUMENTS 4338424  5/1994  Germany .

OTHER PUBLICATIONS

"Exxon Bromo XP-50 Rubber Compounding" Exxon Chemical Company Brochure, May, 1992.

"Achieving Efficient Co–Cure", Gardner et al., Nov. 3–6, 1992, Presented at a meeting of the Rudder Div. of ACS.

Frechet "Electrophilic Addition of Brominated Poly(isobutylene–4 methyl styrene) to Olefines Catalyzed by Zinc Salts" *Rubber Chemistry and Technology* 66(1) Mar. 1993 pp. 98–108.

Bielski "Electrophilic Aromatic Substitution in the Curing of Brominated Poly(isobutylene 4 methylstyrene" *Journal of Polymer Science: Polymer Chemistry* 31(3) Mar. 1993 pp. 755–762.

*Primary Examiner*—David Buttner
*Attorney, Agent, or Firm*—Myron B. Kurtzman; Frank E. Reid

[57] ABSTRACT

Vulcanizable blends containing a halogenated copolymer of a $C_4$–$C_7$ isomonoolefin and para-alkylstyrene mixed with one or more olefinically unsaturated elastomeric polymers are disclosed. Cure is preferably effected using zinc stearate as a curative at levels below about 3.0 phr which gives rise to vulcanizates having selective interpolymer addition of benzylic halogen present in the halogenated copolymer to the double bond of the unsaturated polymer with no significant self curing of the halogenated polymer taking place.

24 Claims, 2 Drawing Sheets

INTERPOLYMER CURES OF BLENDS COMPRISING HALOGENATED ISOOLEFIN/ PARA-ALKYLSTYRENE ELASTOMERS AND UNSATURATED ELASTOMERS

BACKGROUND OF THE INVENTION

1. Field of the Invention

The invention relates to co-curable elastomer compositions based on a blend of halogenated isomonoolefin/para-alkylstyrene copolymers and olefinically unsaturated elastomers.

2. Description of Related Art

Vulcanizates based on blends of elastomers which contain little or no olefinic unsaturation with more highly unsaturated elastomers are of interest in the rubber industry primarily because of their special properties, e.g., superior resistance to ozone degradation and consequent cracking, improved resistance to chemical attack, improved temperature stability and unique dynamic response. These blends can permit the achieving of synergisms wherein the composite blend possesses combinations of properties unattainable in the individual elastomers. However, these desirable properties can be realized only when an intimate homogeneous blend of the elastomers with phase sizes of less than 5 microns, generally 1 micron or less, is produced and maintained in the blend and a satisfactory level of interfacial adhesion is achieved.

Unfortunately, it generally known that most polymers are not compatible with one another unless specific favorable interactions are present because the favorable entropy of mixing is too small to overcome the unfavorable enthalpy of mixing such that the free energy of mixing is unfavorable. Blends produced by normal techniques are grossly inhomogeneous with phase sizes many microns in diameter. This gross incompatibility of the individual polymers with a consequent inability to produce and maintain the homogeneous fine phase sizes required in synergistic blends is particularly evidenced when the individual polymers differ considerably in solubility parameters as is the case when attempts are made to blend low unsaturation elastomers with the more highly unsaturated elastomers. A further problem is that, even if intimate dispersions can be produced during high shear mixing operations, the mixtures phase-separate when the mixing is stopped so that the final blends are grossly inhomogeneous with the individual phase sizes many microns in diameter. These grossly inhomogeneous blends generally have very poor combinations of properties, usually much worse than the individual polymers, rather than displaying the desirable synergistic combination of properties obtainable in the more intimate homogeneous blends with phase sizes less than 5 microns, preferably 1 micron or less.

Still other problems with blends of low unsaturation elastomers with the more highly unsaturated elastomers are the problems associated with the curing of elastomer compositions containing such chemically diverse materials and the inability to achieve a balanced cure of each individual component and also a truly intervulcanized composition, i.e., a composition where predominant interpolymer crosslinking takes place between different polymer molecules in the different phases. For example, in sulfur curable systems containing a blend of highly unsaturated elastomers such as natural rubber and low unsaturation elastomers such as butyl rubber, the high unsaturation diene phase is much faster curing than the low unsaturation phase and the curatives rapidly diffuse out of the low unsaturation elastomer phases into the high unsaturation elastomer phases resulting in a highly cured polydiene phase and an undercured, curative-starved low unsaturation phase, with little or no interpolymer crosslinking taking place at the phase boundaries. As a consequence of this lack of curing balance, interfacial adhesion is low and the phase sizes are large, and the vulcanizates exhibit inferior mechanical properties such as low tensile strength, low modulus, poor hysteresis and the like.

One technique used to minimize the problem of vulcanization imbalance in such blends is the use of low or no unsaturation blend components which have been modified by the inclusion of functional groups, e.g. halogen, in the polymer chain which functional groups are susceptible to crosslinking mechanisms independent of the sulfur curing system used to crosslink the highly unsaturated elastomer. For example, blends containing halogenated interpolymers of isobutylene and para-methylstryene can be vulcanized along with more highly unsaturated rubbers by including an independent curing system for each type of elastomer into the vulcanization recipe, e.g., a zinc oxide-based curing system which normally cures the halorubber and an accelerated sulfur curing system which normally cures the highly unsaturated rubber. This technique can overcome the cure imbalance but doesn't affect the gross incompatibility discussed above, doesn't produce high interfacial adhesion and does not give rise to truly intervulcanized blends.

Examples of such blends are those containing: (a) one or a mixture of low unsaturated rubbers such as halogenated interpolymers of a $C_4$ to $C_7$ isomonoolefin, e.g., isobutylene, with up to about 20 wt % para-alkylstyrene, e.g., para-methylstyrene, mixed with: (b) one or more olefinically unsaturated elastomers such as natural rubber, polybutadiene, polyisoprene, copolymers of butadiene with styrene or acrylonitrile, and the like.

An Exxon Chemical company brochure entitled "Exxon Bromo XP-50 Rubber Compounding and Applications," May, 1992 discloses that brominated isobutylene/para-methylstyrene copolymers may be self-cured using a combination of zinc oxide and stearic acid, used at levels of about 1.0 and 2.0 parts by weight respectively per 100 parts of rubber (phr). The reference further teaches that neither zinc oxide or stearic acid used alone will cure the rubber, but zinc stearate used alone at levels above 3.0 phr will give rise to fast, scorchy cures which tend to revert on aging. At lower levels, zinc stearate used alone gives slow and impractical cure rates.

In addition, a series of papers presented by Exxon Chemical Company at the Spring and Fall 1992 meetings of the Rubber Division of the American Chemical society suggest that zinc bromide and combinations of zinc bromide or zinc oxide with stearic acid, are effective to varying degrees not only for the self-cure of brominated isobutylene/para-methylstyrene copolymers (hereafter referred to as BI-PMS) but also for the co-cure of such materials when mixed with more highly unsaturated elastomers such as natural rubber, polybutadiene and similar materials. It was concluded in these studies that the curing reactions give rise to both intramolecular curing, i.e., electrophilic substitution reactions involving aromatic moieties in different BI-PMS molecules, as well as interpolymer curing involving electrophilic addition reactions of benzylic bromine across double bonds present in the unsaturated elastomer.

In all these co-cure systems, two competing reaction mechanisms (self-curing and co-curing) are occurring to varying degrees which means that exclusive interpolymer curing between the BI-PMS molecular chains and the unsaturated elastomer chains is not achieved. This curing imbalance may reflect itself as a drop-off of important properties such as modulus, tensile, elongation and the like in comparison to what would be expected as the composition-based averaging of such properties based on the properties exhibited by each cured elastomer alone, i.e., the "tie line" properties.

It should be noted that the achievement of tie line or above tie line rheometer cure performance in curable elastomer blend systems is an unusual phenomenon and represents optimum cure performance. In most systems, rheometer torque increase for cured blends of different elastomers will lie at least partially below the tie line which would be graphically depicted as a straight line over the blend range connecting the rheometer torque increase values associated with each individual elastomer if cured alone. One blend system which allegedly achieves above tie line performance is disclosed in Hopper et al., "Ozone Resistant Blends", International Conference on Advances in the Stabilization and Controlled Degradation of Polymers, Lucene, Switzerland, May 23–25, 1984. The publication discloses sulfur curable blends of modified EPDM rubber and a polydiene rubber such as natural or polybutadiene rubber exhibiting blend torque increases which are generally slightly above tie line values. The modified EPDM employed is the addition product of an N-chlorothio-N-methyl-p-toluene sulfonamide to elastomeric terpolymers of ethylene, propylene and a non-conjugated diene such as 1,4-hexadiene or dicyclopentadiene.

SUMMARY OF THE INVENTION

The present invention is directed towards truly intervulcanizable, intimately homogeneous, compatibilized blends with phase sizes of less than 5 microns comprising a mixture of:

a) a halogenated random copolymer having a number average molecular weight of at least 10,000 comprising at least about 80 weight % of polymerized isomonoolefin containing from 4 to 7 carbon atoms and from about 0.05 up to about 20 weight % of para-alkylstyrene monomer units;

b) an olefinically unsaturated polymer; and c) from about 0.05 to less than 3 parts by weight, per 100 parts by weight of the polymer content of the mixture, of a curing agent comprising a hydrocarbon soluble compound selected from the group consisting of one or a mixture of aluminum, ferric iron, tin and zinc compounds of a carboxylic acid selected from the group consisting of naphthenic, salicylic and $C_{10}$ to $C_{28}$ fatty acids.

The weight ratio of the random copolymer and unsaturated polymer present in the mixture may range from about 1:99 to 99:1 respectively.

The invention also provides a process for preparing a partially cured, compatibilized heat processable elastomeric composition with phase sizes of less than 5 microns comprising:

a) mixing an olefinically unsaturated polymer and the curing agent at a temperature in the range of from about 80° C. to about 170° C. to form a uniform mixture;

b) adding the halogenated random copolymer to the compatibilized mixture and continuing mixing at a temperature in the range of about 100° C. to about 150° C. until a partially cured, compatibilized mixture is obtained, in which the halogenated copolymer has become partially bonded to the unsaturated polymer.

It is believed that the intimate homogeneous blend with preferred phase sizes of 1 micron or less is produced and maintained because the reaction between the halogenated copolymer and the unsaturated polymer produces a compatibilizer which aids in dispersing the incompatible elastomers and stabilizes the dispersion to produce the desired homogeneous blend with phase sizes 1 micron or less and with good interfacial adhesion.

The invention further provides for intervulcanized elastomer blend compositions prepared by subjecting the partially cured mixture prepared above to further vulcanization conditions, with the optional addition of an accelerated sulfur or peroxide curing system for the olefin polymer component of the blend.

The use of the curatives described in this invention, preferably zinc stearate, gives rise to truly intermolecularly cured compositions, i.e., it selectively effects interpolymer addition of benzylic halogen present in the halogenated random copolymer to the double bonds present in the unsaturated polymer with insignificant intramolecular self-curing of the halogenated copolymer taking place so that the compatibilizer which aids in achieving and stabilizing the fine phase size composite is produced. The resulting vulcanizates exhibit a very balanced curing, and physical properties which are above the tie line or average values which might be expected based on the cure of compositions containing the individual polymer components themselves.

DETAILED DESCRIPTION OF THE INVENTION

The present invention provides a curable composition based on a mixture or blend of the halogenated random copolymer (a) and a different olefinically unsaturated polymer or copolymer (b) characterized that when formulated with the curing agent described herein, and subjected to vulcanization conditions, the blend composition exhibits a maximum rheometer torque increase ratio in accordance with the formula:

$$\Delta M_{a+b}/(\Delta M_a f_a + \Delta M_b f_b)$$

of greater than 1.25, preferably greater than 1.5 and more preferably greater than 2.0, wherein:

$\Delta M_{a+b}$=the torque increase observed for the blend of polymer (a) and polymer (b);

$\Delta M_a$=the torque increase observed for polymer (a) on its own;

$f_a$=the weight fraction of polymer (a) in the blend;

$\Delta M_b$=the torque increase observed for polymer (b) on its own;

$f_b$=the weight fraction of polymer (b) in the blend.

The cure characteristic of torque increase ($\Delta M$), also designated as $M_H-M_L$, is evaluated using a Monsanto Rheometer at 3° arc in accordance with ASTM procedure D-2084-71T. $M_L$ represents minimum pre cure torque and $M_H$ represents the highest torque achieved under cure conditions, e.g., at 160° C. and 60 minute cure time. The torque increase due to vulcanization is therefore the value of $M_H$ minus the value of $M_L$, ($M_H$–$M_L$) measured in pound-inches (lb.-in.).

Figure 3:
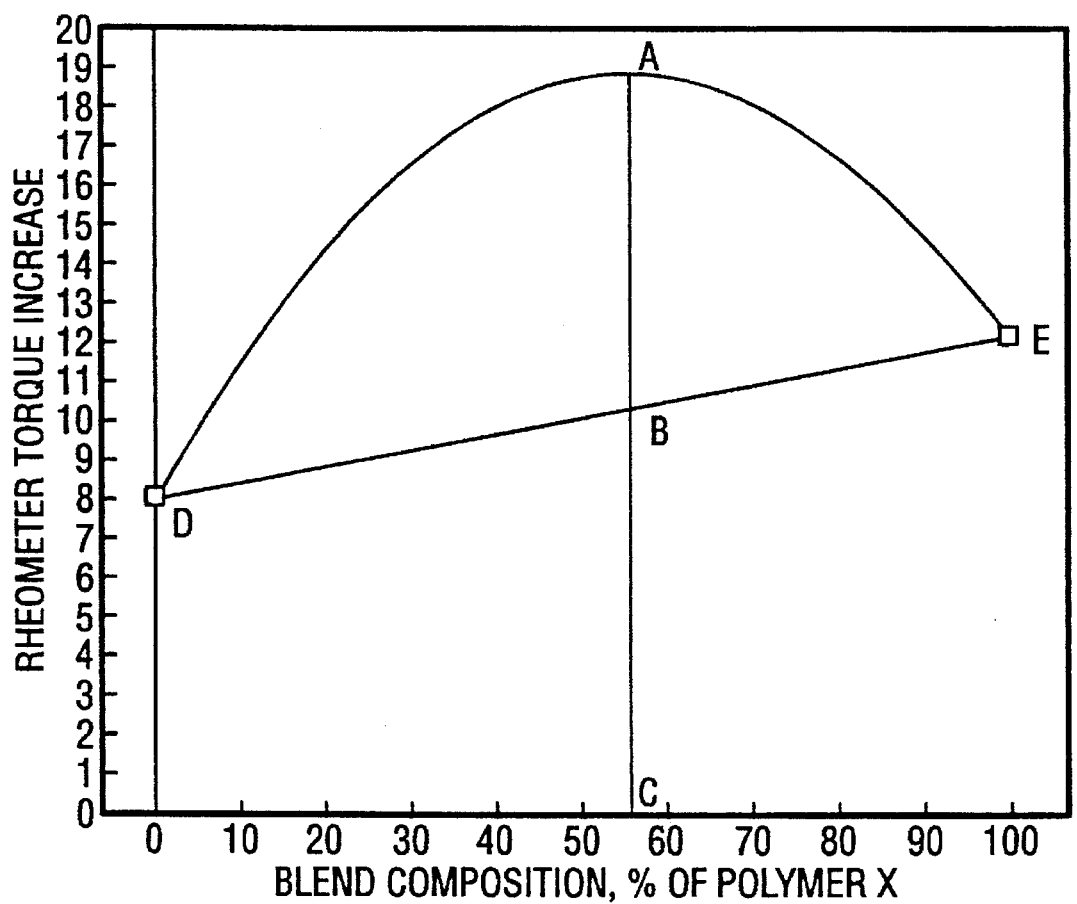
FIG. 3 is a general graphic illustration plotting tie-line values and torque increase values for elastomer blend compositions based on varying content of blend components.

The blend composition of the invention exhibits a synergistic curing effect in the sense that the curing agent promotes intermolecular bonding between molecules of polymer (a) and polymer (b). FIG. 3 illustrates conceptually the plot of rheometer torque increase versus composition for blends of the present invention. In particular, the blends of the present invention will show a plot similar to the curved line DAE in FIG. 3. The points D and E, further identified with squares, represent the rheometer torque increases observed for polymers (a) and (b) on their own. The characteristic feature of the present invention reflected in this plot is that for any blend (i.e., excluding the points D and E), the curved line DAE is consistently above the straight line DBE. The straight line DBE is referred to as the "tie line" and represents the weighted average of the rheometer torque increases for the individual polymers (a) and (b). Hitherto, tie line performance has been regarded as the ultimate achievement in cocuring. However, it should be noted that this can and often is achieved simply by optimizing the individual intrapolymer cocuring of each of the polymers in the blend. The achievement of tie line performance does not imply the occurrence of interpolymer cocuring. On the other hand, a rheometer torque increase plot that is consistently and significantly above the tie line, as in the curved line DAE in FIG. 1, is indicative of effective interpolymer cocuring.

It should be noted that the achievement of tie line performance is an unusual phenomenon and that for most systems the plot of rheometer torque increase versus composition will lie, at least partially, below the tie line.

Figure 1:
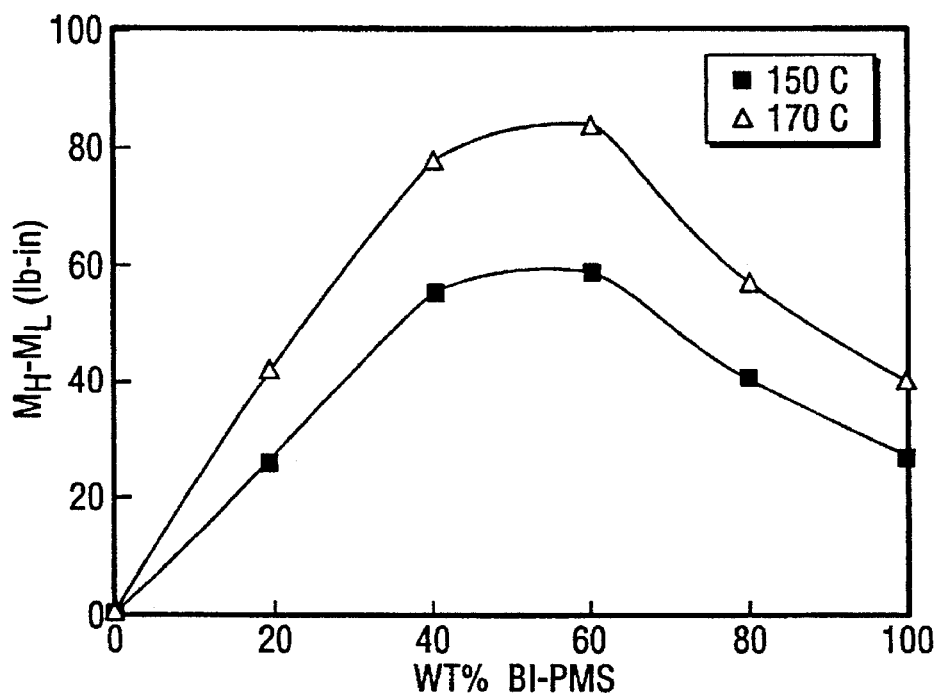
FIGS. 1 and 2 are plots of curing behavior as indicated by rheometer torque values for compositions containing various amounts of the polymer components of the blends of this invention.

The extent of interpolymer cocuring of a polymer blend may be measured by the ratio AC/BC in FIG. 1. This ratio is a graphical depiction of the maximum rheometer torque increase ratio ($\Delta$Ma+b) described above. For typical compositions of the prior art, for which the observed plot is not consistently above the tie line, this quantity is not conveniently measurable. For the few compositions of the prior art that achieve tie line performance, the value for this ratio is unity. For the compositions of the present invention this ratio is greater than 1.25 preferably greater than 1.5, most preferably greater than 2.0.

The halogenated $C_4$–$C_7$ isoolefin/para-alkylstyrene starting materials used in the blends of this invention are the halogenation product of random copolymers of a $C_4$ to $C_7$ isomonoolefin, such as isobutylene, and a para-alkylstyrene comonomer, preferably para-methylstyrene containing at least about 80%, more preferably at least about 90% by weight of the para isomer, and wherein at least some of the alkyl substituent groups present in the styrene monomer units contain halogen. Preferred materials may be characterized as isobutylene interpolymers containing the following monomer units randomly spaced along the polymer chain:

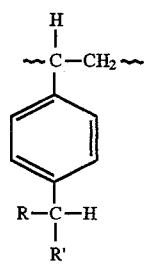

1.

and

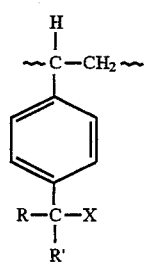

2.

wherein R and R' are independently hydrogen, lower alkyl, preferably $C_1$ to $C_4$ alkyl, and X is bromine or chlorine, and wherein the interpolymer is otherwise substantially free of ring halogen or halogen in the polymer backbone chain. Preferably R and R' are each hydrogen. From about 5 up to about 60 mole % of the para-alkylstyrene present in the interpolymer structure may be the halogenated structure (2) above.

Most useful of such materials are elastomeric interpolymers of isobutylene and para-methylstyrene containing from about 0.5 to about 20 mole % para-methylstyrene wherein up to about 60 mole % of the methyl substituent groups present on the benzyl ring contain a bromine or chlorine atom, preferably a bromine atom. These interpolymers have a substantially homogeneous compositional distribution such that at least 95% by weight of the polymer has a para-alkylstyrene content within 10% of the average para-alkylstyrene content of the polymer. They are also characterized by a narrow molecular weight distribution (Mw/Mn) of less than about 5, more preferably less than about 2.5, a preferred viscosity average molecular weight in the range of from about 300,000 up to about 2,000,000, and a preferred number average molecular weight in the range of from about 25,000 to about 750,000, as determined by Gel Permeation Chromatography.

The interpolymers may be prepared by slurry polymerization of the monomer mixture using a Lewis Acid catalyst, followed by halogenation, preferably bromination, in solution in the presence of halogen and a radical initiator such as heat and/or light and/or a chemical initiator.

Preferred brominated interpolymers generally contain from about 0.1 to about 5 mole % of bromomethyl groups, most of which is monobromomethyl, with less than 0.05 mole % dibromomethyl substituents present in the copolymer. These polymers, their method of preparation, their method of cure and graft or functionalized polymers derived therefrom are more particularly disclosed in U.S. Pat. No. 5,162,445, the complete disclosure of which is incorporated herein by reference.

The olefinically unsaturated polymer component with which the halogenated elastomeric copolymer may be blended includes elastomeric conjugated diene (diolefin) polymers such as polybutadiene, natural rubber, synthetic polyisoprene, copolymers of butadiene with up to about 40 wt % of styrene or acrylonitrile, polychloroprene, and mixtures thereof. The unsaturated polymer may also be non-elastomeric and may include liquid to waxy polybutadiene or butadiene copolymers having a number average molecular weight in the range of about 300 up to 10,000. other unsaturated polymers include elastomeric copolymers containing a lower content of olefinic unsaturation, including copolymers of isobutylene containing from about 0.5 to 10 wt % of copolymerized isoprene (so called butyl rubber) and rubbery terpolymers of ethylene, 25–60 wt % propylene and from about 1 to 15 wt % of a non-conjugated diene such as ethylidenenorbornene, 1,4-pentadiene, cyclohexadiene, 1,4-hexadiene dicyclopentadiene, and like comonomers (so called EPDM rubber).

The compositions may contain the halogenated polymer and unsaturated polymer components in a weight ratio in the range of from about 1:99 to 99:1 each respectively, more preferably in the range of from about 10:90 to 90:10 and most preferably from about 25:75 to 75:25.

The curative used to promote the co-curing reaction between the halogenated polymer and the unsaturated elastomer in the present invention is a hydrocarbon soluble compound of a metal which exhibits strong Lewis Acid activity. Preferably these compounds are selected from the group consisting of aluminum, iron, tin and zinc compounds (salts) of carboxylic acids, such as salicylic acid, naphthenic acid and $C_{10}$ to $C_{28}$ fatty acids such as stearic and oleic acids. Zinc stearate is the most preferred of these curatives and the invention is illustrated using this preferred material.

As discussed above, zinc stearate is a known co-curative for the brominated isobutylene/para-methylstyrene (BI-PMS) copolymers used as a component in the blends of this invention, particularly when used in combination with zinc oxide and stearic acid. Used alone as a curative, it shows little cure activity at levels below 3.0 phr, and no cure activity if used to cure olefinically unsaturated polymers such as diolefin polymers. Thus it is most unexpected that a curative, which will not cure or only very poorly cure the individual polymeric components of the blends of this invention, will cure mixtures of these polymers. The curative forms a bond between a molecule of the halogenated polymer and a molecule of the olefinically unsaturated polymer (interpolymer cocuring) much more readily than it forms bonds between like molecules present in the blend (intrapolymer curing).

Zinc stearate is a commercially available material commonly produced by the action of sodium stearate on an aqueous solution of zinc sulfate.

The level of zinc stearate curative incorporated into the curable elastomeric blend composition may range from about 0.05 up to less than about 3.0 parts by weight per 100 parts by weight of the combined polymer content of the mixture (phr),more preferably at a level of from about 0.05 to about 2 phr, and most preferably at a level from about 0.1 to 0.3 phr. Expressed another way, zinc stearate is preferably used at levels such that the molar ratio of zinc stearate to benzylic halogen, e.g. bromine, present in the halogenated polymer is below about 0.5, most preferably in the range of about 0.05 to about 0.25. Where zinc stearate is used at higher levels within the 0.05 to less than 3.0 phr range, it is preferred to conduct the compounding process at lower temperatures within the 80° C. to 170° C. range to avoid scorch or premature curing.

The composition may also contain one or more optional supplemental curatives where it is desired to modify or fine tune the cure of the rubber. These supplemental curatives are preferably not added to the mixture until after an initial cure is developed during the hot mixing of the halogenated polymer, unsaturated elastomer and the zinc stearate. Such supplemental curatives include peroxides, sulfur or conventional sulfur-containing cure accelerators.

Examples of suitable peroxides include organic peroxides such as dialkyl peroxides, ketal peroxides, aralkyl peroxides, peroxyethers and peroxyesters. Preferred peroxides include di-cumylperoxide, di-tert-butylperoxide, benzoyl peroxide, tert-butylperbenzoate and like known free radical generators. The quantity of peroxide generally ranges from about 0.5 to 10 parts by weight per hundred parts by weight of rubber (phr), more preferably from about 1.5 to 6 parts phr.

Accelerated sulfur vulcanization systems which may be used as curatives in the present invention include sulfur or mixtures of sulfur and sulfur-containing accelerators and/or phenol-formaldehyde resins. Suitable accelerators include benzothiazyl disulfide, N-oxydiethylene benzothiazole-2-sulfenamide, 2-mercaptoben-zothiazole, alkyl phenol disulfides, alkyl-thiuram sulfides, m-phenylenebismaleimide, N, $N^1$-diarylguanidines, dialkyl and diaryl-dithiocarbamates, and like materials.

Suitable dialkyldithiocarbamates include the dialkyldithiocarbamates of zinc, bismuth, cadmium, copper, lead, selenium, and tellurium wherein the alkyl group contains from 1 to 5 carbon atoms, piperidinium pentamethylene-dithiocarbamate and mixtures thereof.

Suitable diarylthiocarbamates include the diaryldithiocarbamates of zinc, bismuth, cadmium, copper, lead, selenium, tellurium, and mixtures thereof.

Suitable alkyl thiuram sulfides include dipentamethylene thiuram tetrasulfide, tetrabutylthiuram disulfide, tetraethylthiuram disulfide, tetramethylthiuram monosulfide, tetra-benzyl thiuram disulfide, and mixtures thereof.

Sulfur and vulcanization accelerators are normally added to the composition at levels in the range of from about 0.5 to about 8 by weight parts phr.

The accelerated sulfur curing system may also be used as a cocurative in curing systems also containing zinc oxide or an equivalent thereof, as an auxiliary curative agent. Zinc oxide is normally used in such systems at a level of from about 0.2 to about 7 parts by weight per 100 parts by weight of elastomer. The present invention provides for particularly good low cure reversion where zinc oxide is present at levels in the range of from about 0.5 to about 5.0 parts by weight per 100 parts by weight of elastomer.

The use of conventional fatty acid co-cure additives such as stearic acid is preferably avoided since it has been found that the presence of conventional quantities of free carboxylic acid in the composition tends to quench the vulcanization reaction. Preferably, the curative consists essentially of zinc stearate and does not contain any other cure additives which tend to seriously detract from the balanced selective intervulcanization properties achieved.

The elastomer composition may also contain other additives such as scorch retarders, lubricants, fillers, plasticizers, tackifiers, coloring agents, blowing agents, and antioxidants, provided these do not interfere with curing as discussed above.

Examples of fillers include inorganic fillers such as reinforcing grade carbon black, silica, calcium carbonate, talc and clay, and organic fillers such as high-styrene resin, coumarone-indene resin, phenolic resin, lignin, modified melamine resins and petroleum resins.

Examples of lubricants include petroleum-type lubricants such as oils, paraffins, and liquid paraffins, coal tar type lubricants such as coal tar and coal tar pitch; waxes such as beeswax, carnauba wax and lanolin; and synthetic polymeric substances such as petroleum resins.

Examples of plasticizers include hydrocarbon oils, e.g., paraffin, aromatic and napththenic oils, phthalic acid esters, adipic acid esters, sebacic acid esters and like plasticizers.

Examples of tackifiers are petroleum resins, coumarone-indene resins, terpene-phenol resins, and xylene/formaldehyde resins.

Examples of coloring agents are inorganic and organic pigments.

Examples of blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, p-toluenesulfonyl azide, urea, and the like.

The vulcanizable, compatiblized composition may be prepared and blended using any suitable mixing device such as an internal mixer (Brabender Plasticorder), a Banbury Mixer, an extruder, a mill mixer, a kneader or a similar mixing device. Preferred blending temperatures and times may range from about 100° C. to 150° C. and from about 1 to 15 minutes respectively. All ingredients, i.e., the polymer components and the zinc stearate, may be combined simultaneously in the mixer or mixed in sequence.

In a preferred embodiment, the unsaturated polymer and at least a portion or all of the zinc stearate curative are first mixed at a temperature of 130° C. to 150° C. for a period of from 1 to 5 minutes until a uniform mixture is obtained. Then the halogenated copolymer and any balance of the zinc stearate curative is added to the mixture and mixing continued at 130° C. to 150° C. for a period of 1 to 5 minutes to uniformly disperse the halogenated interpolymer within the matrix.

During the mixing process, partial curing of the mixture will commence as indicated by an increase in Mooney viscosity of the mixture. Conventional additives such as fillers, processing aids and the like can be added during either or both stages of the mixing process, although they are preferably added in the first stage. Additional elastomers may be also added after the first stage mixing.

After the hot mixing to produce cocure and compatibilization between the halogenated polymer and the high unsaturation polymer and achieve a stable compatibilized blend, supplemental vulcanization agents such as sulfur and conventional accelerators as described above may be optionally added and mixed in to adjust the vulcanization of the high unsaturation elastomer phases during subsequent forming and vulcanization operations.

The mixture is then removed from the mixer and may be subsequently vulcanized by forming the mixture into shapes and heating at a temperature of about 150° C. to 190° C. for a period of from about 5 to 60 minutes.

The following examples are illustrative of the invention. The materials used in the examples are as follows:

A. Brominated isobutylene/para-methylstyrene copolymers:

| DESIGNATION | BI-PMS 90-3 | BI-PMS 89-4 | BI-PMS 90-10 | BI-PMS 126-40 |
| --- | --- | --- | --- | --- |
| ML, 1 + 8, 125° C. | 54.0 | 46.8 | 43.8 | 32.9 |
| PMS, mole % | 1.77 | 1.74 | 2.35 | 2.32 |
| BrPMS, mole % | 0.48 | 0.59 | 1.15 | 1.96 |
| BR, wt % | 0.85 | 1.04 | 1.94 | 2.83 |

As set forth above ML, [1+8, 125° C.] is the polymer Mooney viscosity, PMS and BrPMS are the polymer contents of unbrominated and brominated 4-methylstyrene units measured by nuclear magnetic resonance spectroscopy and Br, wt % is the polymer bromine content measured by X-ray fluorescence spectroscopy.

B. General purpose unsaturated polymers:

| | |
| --- | --- |
| NR | Natural rubber having a Mooney Viscosity ML (1 + 4) at 100° C. of 45–55. (SMRL) |
| IR | A synthetic polyisoprene having a Mooney Viscosity ML (1 + 4) at 100° C. of 70–90 (NATSYN ® 2200). |
| E-SBR | A copolymer of butadiene and 23.5 wt % of bound styrene having a Mooney Viscosity ML (1 + 4) at 100° C. of 35 produced by emulsion polymerization (SBR-1502). |
| S-SBR | A copolymer of butadiene and 12 wt. % styrene having a Mooney Viscosity ML (1 + 4) at 100° C. of 84 produced by solution polymerization (SOLFLEX ® 1216). |
| BR | A polybutadiene homopolymer having a Mooney Viscosity ML (1 + 4) at 100° C. of 50–60 produced by solution polymerization (BUDENE ® 1208). |

The examples below include control experiments in which zinc stearate was absent from the formulation and this is designated with an "a" post script. The "a" examples are not examples of the present invention. Examples with other postscripts are or are not examples of the present invention and this is so indicated below.

In Examples 1 to 21, polymers were mixed in a Brabender mixer at temperatures generally less than 150° C. The effect of the zinc stearate on polymer crosslinking was assessed by the factor "DELTA(ML)", which is the difference in Mooney viscosities between products from one experiment in which zinc stearate was present and from a control experiment (designated "a") in which it was not.

The following mixing procedure was used, unless otherwise indicated, using a 300 ml Brabender mixer:
  a) add unsaturated polymer, inert polymer, (if any) and filler (if any), to mixer and bring to temperature;
  b) add zinc stearate, if present;
  c) mix at temperature for 3 minutes;
  d) add BI-PMS polymer, if present, and mix at temperature for an additional 5 minutes;
  e) dump product from the mixer.

Quantities of materials shown in the Examples are in grams.

EXAMPLES 1–3

In examples 1b to 1d, mixtures (85:15 weight ratio) of BR and BI-PMS were reacted in the mixer at 140° to 150° C. with small quantities of zinc stearate (0.1 to 0.3 phr). The increased Mooney viscosities, DELTA(ML), of the products compared to that of the control (example 1a) show that crosslinking has occurred. The extent of crosslinking judged by the magnitude of DELTA(ML) increases as zinc stearate concentration increases. In contrast, when either BR alone (examples 2a, 2b) or the BI-PMS polymer alone (examples 3a, 3b) were subjected to the same treatment, there was no increase in product Mooney viscosity compared to the control experiment without zinc stearate. In fact, there is a slightly negative DELTA(ML). Note also that zinc stearate is not active at these concentrations and temperatures in BI-PMS self-curing. Additionally, the equivalent ratio of zinc stearate to BI-PMS benzylic bromine (ZnST$_2$/BrPMS in the last line of Table 1) is well below the desired value of unity for optimum curing of BI-PMS polymer with zinc derivatives. The data suggests that the Mooney viscosity increase observed in examples 1b to 1d is due to interpolymer crosslinking. These are examples of the present invention. The other examples in Table 1 are not.

TABLE 1

| | EXAMPLE | | | | | | | |
|---|---|---|---|---|---|---|---|---|
| | 1a | 1b | 1c | 1d | 2a | 2b | 3a | 3b |
| Budene 1208 | 204 | 204 | 204 | 204 | 240 | 240 | | |
| BI-PMS | 36 | 36 | 36 | 36 | | | 240 | 240 |
| Zinc Stearate | 0.00 | 0.24 | 0.48 | 0.72 | | 0.48 | | 0.48 |
| DUMP TEMP, C. | 150 | 148 | 142 | 150 | 147 | 146 | 137 | 139 |
| ML, 1 + 8, 100 C. | 38.3 | 42.2 | 78.2 | 99.4 | 46.7 | 46.3 | 78.0 | 77.8 |
| DELTA (ML) | 0.0 | 3.9 | 39.9 | 61.1 | | −0.4 | | −0.2 |
| ZnST$_2$, phr | 0.0 | 0.1 | 0.2 | 0.3 | 0.0 | 0.2 | 0.0 | 0.2 |
| ZnST$_2$/BrPMS | 0.00 | 0.05 | 0.11 | 0.16 | | | 0.00 | 0.02 |

Notes to Table 1.
ZnST$_2$ = zinc stearate
ZnST$_2$/BrPMS = equivalent ratio (i.e., twice the atomic ratio) of Zn to benzylic Br in the reaction mixture.

EXAMPLES 4 to 7

In these examples, the BR content of the reaction mixtures was varied while the BI-PMS polymer content was maintained constant. This required addition of a third inert polymer and for this purpose an unbrominated isobutylene/ 4-methylstyrene copolymer (designated XP-50) was used. The results in Table 2 show that as the concentration of BR in the reaction mixture increases, so does the DELTA(ML). This confirms that the BR polymer plays a role in the crosslinking process found in examples 1b to 1d. It will be noted that DELTA(ML) is close to zero for example 4b, confirming that the XP-50 polymer is indeed inert in the sense required here.

Examples 5b to 7b are examples of the present invention and the other examples in Table 2 are not.

TABLE 2

| | EXAMPLE | | | | | | | |
|---|---|---|---|---|---|---|---|---|
| | 4a | 5a | 6a | 7a | 4b | 5b | 6b | 7b |
| XP-50 | 204 | 136 | 102 | | 204 | 136 | 102 | |
| Budene 1208 | | 68 | 102 | 204 | | 68 | 102 | 204 |
| Zinc Stearate | | | | | 0.72 | 0.72 | 0.72 | 0.72 |
| BI-PMS | 36 | 36 | 36 | 36 | 36 | 36 | 36 | 36 |
| DUMP TEMP, C. | 139 | 138 | 139 | 150 | 139 | 140 | 142 | 150 |
| ML, 1 + 8, 100 C. | 76.0 | 50.4 | 44.8 | 38.3 | 72.8 | 74.0 | 72.0 | 99.4 |
| DELTA (ML) | | | | | −3.2 | 23.6 | 27.2 | 61.1 |
| Budene, wt % | | | | | 0.0 | 28.3 | 42.5 | 85.0 |

NOTES TO TABLE 2
XP-50 is a non-halogenated isobutylene/para-methylstyrene copolymer having a para-methylstyrene content of about 5.0 wt % (about 2.2 mole %).

EXAMPLES 8 TO 11

These examples were similar to examples 4 to 7, except that BI-PMS content of the reaction mixtures was varied while the BR polymer content was maintained constant. The increase in DELTA(ML) with increase in BI-PMS polymer content of the reaction mixture confirms that the BI-PMS polymer is also involved in the crosslinking process found in examples 1b to 1d.

Examples 9b to 11b are examples of the present invention, and the other examples in Table 3 are not.

TABLE 3

| | EXAMPLE | | | | | | | |
|---|---|---|---|---|---|---|---|---|
| | 8a | 9a | 10a | 11a | 8b | 9b | 10b | 11b |
| XP-50 | 104 | 86 | 68 | 32 | 104 | 86 | 68 | 32 |
| Budene 1208 | 136 | 136 | 136 | 136 | 136 | 136 | 136 | 136 |
| Zinc Stearate | | | | | 0.72 | 0.72 | 0.72 | 0.72 |
| BI-PMS90-10 | | 18 | 36 | 72 | | 18 | 36 | 72 |
| DUAL TEMP, C. | 141 | 141 | 140 | 141 | 142 | 143 | 142 | 140 |
| ML, 1 + 8, 100 C. | 43.2 | 42.8 | 41.2 | 40.1 | 39.7 | 62.2 | 103.7 | 120.2 |
| DELTA (ML) | | | | | −3.5 | 19.4 | 62.5 | 80.1 |
| Budene, wt % | | | | | 0.0 | 7.5 | 15.0 | 30.0 |

EXAMPLES 12 to 15

These examples were similar to examples 8 to 11, except that instead of varying the BI-PMS polymer content of the reaction mixture, a constant weight of BI-PMS polymer with varying content of brominated 4-methylstyrene units was used. The results in Table 4 show an increase in DELTA (ML) as the content of brominated 4-methylstyrene units increases. This indicates that it is the benzylic bromine of the BI-PMS polymer that is active in the interpolymer crosslinking process found in examples 1b to 1d.

Examples 12b to 15b are examples of the present invention, and the other examples in Table 4 are not.

TABLE 4

| | EXAMPLE | | | | | | | |
|---|---|---|---|---|---|---|---|---|
| | 12a | 13a | 14a | 15a | 12b | 13b | 14b | 15b |
| XP-50 (5% PMS) | 68 | 68 | 68 | 68 | 68 | 68 | 68 | 68 |
| Budene 1208 | 136 | 136 | 136 | 136 | 136 | 136 | 136 | 136 |
| Zinc stearate | | | | | 0.48 | 0.48 | 0.48 | 0.48 |
| BI-PMS 90-3 | 36 | | | | 36 | | | |
| BI-PMS 89-4 | | 36 | | | | 36 | | |
| BI-PMS 90-10 | | | 36 | | | | 36 | |
| BI-PMS 126-40 | | | | 36 | | | | 36 |
| DUMP TIME, C. | 138 | 138 | 140 | 139 | 140 | 138 | 141 | 142 |
| ML, 1 + 8, 100 C. | 34.3 | 36.3 | 36.8 | 38.4 | 42.6 | 52.3 | 54.9 | 66.0 |
| DELTA (ML) | | | | | 8.3 | 16.0 | 24.1 | 27.6 |
| BrPMS, mole % | | | | | 0.48 | 0.59 | 1.15 | 1.96 |

NOTE TO TABLE 4
BrPMS is the content of brominated para-methylstyrene units present in the polymer.

EXAMPLES 16 TO 18

Examples 16 and 17 were carried out in the manner of Example 1c, except that instead of the BR polymer, an SBR polymer was used. The results in Table 5 show with both SBR polymers some increase occurs in product Mooney viscosity due to the presence of zinc stearate [DELTA(ML)]. However the increase for the emulsion SBR polymer, SBR 1502, is noticeably smaller than that for the solution SBR polymer, SOLFLEX 1216. This is attributed to the presence in emulsion SBR of as much as 6 to 8 percent by weight of carboxylic acids (based on manufacturer's data sheets) which remain in the polymer from the emulsion polymerization process. When, in example 18, the reaction of example 17 was repeated, but with the addition of 4 percent by weight of stearic acid, the crosslinking reaction was completely quenched and a slightly negative DELTA(ML) was observed. This experiment shows that the interpolymer crosslinking reaction is inhibited by carboxylic acids, such as stearic acid, which are commonly used in elastomer processing.

DELTA(ML) for the solution SBR polymer, SOLFLEX 1216, in example 17 is less than that noted in example 1c for a similar reaction with BR polymer. Thus, in terms of reactivity in the present interpolymer crosslinking reaction, the order of reactivity is BR>SBR. This is consistent with the lower content of olefinic double bonds in the latter and with the notion that the reaction is indeed one of addition of the benzylic bromine to the double bond of the unsaturated polymer.

TABLE 5

|  | EXAMPLE | | | | | |
| --- | --- | --- | --- | --- | --- | --- |
|  | 16a | 17a | 18a | 16b | 17b | 18b |
| SBR 1502 | 204 | | | 204 | | |
| Solflex 1216 | | 204 | 204 | | 204 | 204 |
| Stearic acid | | | 12 | | | 12 |
| Zinc stearate | | | | 0.48 | 0.48 | 0.48 |
| BI-PMS 90-10 | 36 | 36 | 36 | 36 | 36 | 36 |
| DUMP TEMP, C. | 140 | 139 | 143 | 138 | 143 | 140 |
| ML, 1 + 8, 100 C. | 44.2 | 78.6 | 54.2 | 45.6 | 101.3 | 52.6 |
| DELTA (ML) | | | | 1.4 | 22.7 | −1.6 |
| ZnST$_2$, phr | | | | 0.2 | 0.2 | 0.2 |

EXAMPLES 19 TO 21

In these examples, the relative ordering of reactivity in interpolymer crosslinking of a BR polymer (Budene 1208), an IR polymer (Natsyn 2200) an NR polymer are compared. Because of the anticipated higher reactivity of the polyisoprene polymers (IR and NR) versus that of the polybutadiene, a lower zinc stearate concentration (0.1 phr) was used than that used in examples 1c and 17 (0.2 phr) for comparing the relative reactivities of BR and solution SBR.

Examples 19b to 21b are examples of the present invention and the other examples in Table 6 are not.

The results in Table 6 show that the ordering of reactivity is NR>IR>BR. Combining this with the data shown above, an overall reactivity in interpolymer crosslinking is found to be NR>IR>BR>SBR. This ordering is consistent with the fact that interpolymer crosslinking is taking place as an electrophilic addition to the double bond of the diolefin polymer.

TABLE 6

|  | EXAMPLE | | | | | |
| --- | --- | --- | --- | --- | --- | --- |
|  | 19a | 20a | 21a | 19b | 20b | 21b |
| Budene 1208 | 204 | | | 204 | | |
| Natsyn 2200 | | 204 | | | 204 | |
| SMR L | | | 204 | | | 204 |
| Zinc stearate | | | | 0.24 | 0.24 | 0.24 |
| BI-PMS | 36 | 36 | 36 | 36 | 36 | 36 |
| DUMP TEMP, C. | 150 | 147 | 148 | 148 | 146 | 143 |
| ML, 1 + 8, 100 C. | 38.3 | 30.9 | 57.6 | 42.2 | 40.1 | 74.2 |
| DELTA ML | — | — | — | 3.9 | 9.2 | 16.6 |
| ZnST$_2$, phr | — | — | — | 0.1 | 0.1 | 0.1 |

EXAMPLES 22 AND 23

Figure 2:
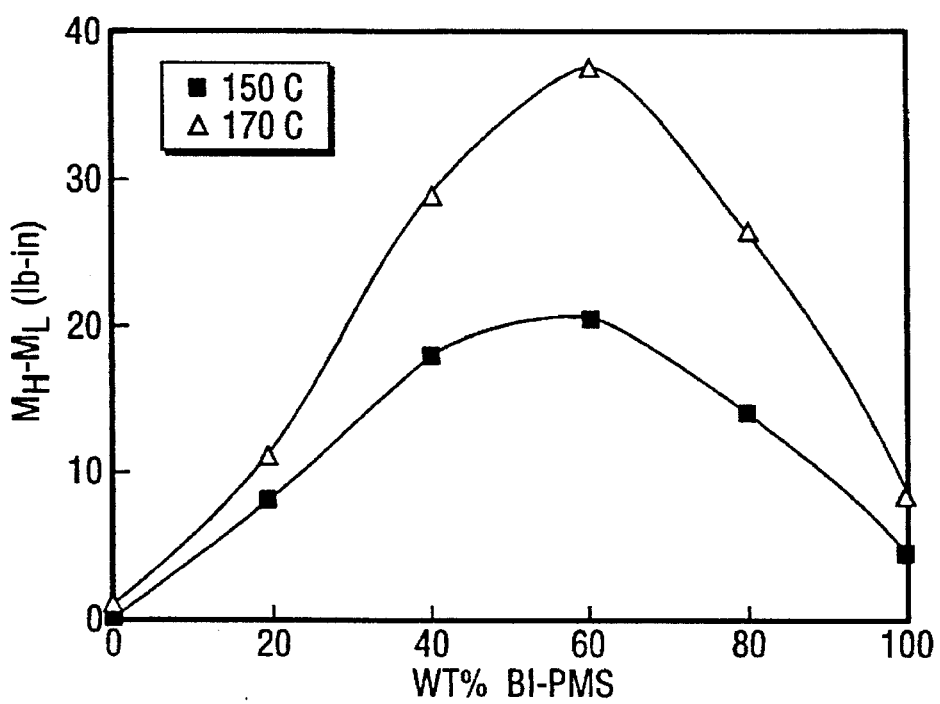

In these examples, mixtures of a BR polymer and BI-PMS polymer, with and without N-660 carbon black filler, were cured in an oscillating disc rheometer at temperatures of 140° C. and 170° C. The results are shown in FIGS. 1 and 2. Although the BR polymer does not cure at all on its own ($M_H$–$M_L$=0) and the BI-PMS polymer cures rather poorly on its own, there is a remarkable cure development for mixtures of the two polymers peaking at an BI-PMS content of about 60% by weight. These Figures show clearly the synergism of having both BI-PMS and unsaturated polymers present in the blend. This synergistic cure is obtained using conditions that are typical of commercial practice (cure temperatures above 150° C. and carbon black filler present).

The above examples clearly demonstrate that zinc stearate is a curing reagent which gives rise to selective interpolymer addition of benzylic bromide present in BI-PMS copolymers to the double bond of unsaturated diolefin polymers at the expense of intra polymer self curing of the BI-PMS copolymers. A comparison of the differential rheometer values shown in FIGS. 1 and 2 (MH minus ML) also shows that at all levels of polybutadiene and BI-PMS, the tie-line values consistently exceed the expected tie-line values based on the cure of each polymer alone at 150° C. and 170° C. This is indicative of enhanced vulcanization efficiency as a consequence of intermolecular crosslinking.

EXAMPLES 24–30

These examples illustrate that elastomer blends containing BI-PMS polymer and relatively low unsaturation elastomers such as Butyl rubber and EPDM rubber can be co-cured in accordance with this invention.

Two sets of binary blends of BI-PMS 90-10 with elastomers having varying degrees of unsaturation were made on a rubber mill using the mixing process described above. The compositions of the two sets in wt % are as shown below:

| BI-PMS 90-10 | 60 | 40 |
| --- | --- | --- |
| Second elastomer | 40 | 60 |
| Zinc stearate | 1 | 1 |

The second elastomers (approximate unsaturation content) were:

| Ex. 25 | XP-50 712, an isobutylene/4-methylstyrene copolymer (0.0 mmole/g) |
| --- | --- |
| Ex. 26 | Vistanex ® L-80, a polyisobutylene (0.0 mmole/g) |
| Ex. 27 | Vistalon ® 404, an ethylene/propylene copolymer (0.0 mmole/g) |
| Ex. 28 | Butyl 268, an isobutylene/isoprene copolymer (0.3 mmole/g) |
| Ex. 29 | Vistalon ® 6505, an ethylidenenorbornene based EPDM (0.8 mmole/g) |
| Ex. 30 | Budene ® 1208 (18.2 mmole/g) |

The two sets of blends were cured in an oscillating disk rheometer. The torque increase observed is noted in Table 7. It will be understood that the first entry in Table 7 (Ex. 24) represents a control sample, which was 100% BI-PMS 90-10. The results show that all saturated elastomers exhibit a reduced value of ($M_H$–$M_L$) when compared to the 100% BI-PMS 90-10 control. This is simply a dilution effect. However all of the blends containing an unsaturated elastomer show an increased value of ($M_H$–$M_L$) when compared to the 100% BI-PMS 90-10 control. Furthermore, the extent increases with increase in the unsaturation content of the unsaturated elastomer (there are structural differences in the olefin types present and exact proportionally is not expected). The increased rheometer response is attributed to the occurrence of an interpolymer co-curing process between the brominated isobutylene/4-methylstyrene copolymer (BI-PMS 90-10) and the unsaturated elastomer. It is to be noted that examples 24–27 are not within the scope of this invention, but examples 28–30 are within the invention.

TABLE 7

| | Second Elastomer | MH – ML | MH – ML (40% 2nd elastomer) | MH – ML (60% 2nd elastomer) |
|---|---|---|---|---|
| Ex. 24 | BI-PMS 90-10 | 23.82 | — | — |
| Ex. 25 | XP-50 712 | — | 16.61 | 21.53 |
| Ex. 26 | VISTANEX ® L-80 | — | 11.45 | 18.18 |
| Ex. 27 | VISTALON ® 404 | — | 5.37 | 5.89 |
| Ex. 28 | BUTYL 268 | — | 25.55 | 32.44 |
| Ex. 29 | VISTALON ® 6505 | — | 43.92 | 45.20 |
| Ex. 30 | BUDENE ® 1208 | — | 55.34 | 58.73 |

EXAMPLE 31

In this example, a control 25/75 wt % blend of BI-PMS (89-4) and BR with 50 phr of carbon black (N-660) was prepared in a B-Banbury Mixer using a standard 6 minute mix cycle with a dump temperature of 140° C. A sample of the blend was prestained by soaking for 48 hours in 0.5 wt. % aqueous osmium tetroxide solution and then a thin section (t=100 nm) was cryomicrotomed and imaged in a TEM (using 100 KV el.). The photomicrograph revealed that the unvulcanized blend was grossly inhomogeneous with phase sizes much larger than 1 micron and with all of the carbon black in the polybutadiene (BR) phases.

EXAMPLE 32

In a companion experiment run in accordance with the teaching of this invention, 0.1 phr of zinc stearate was added along with the polymers and the dump temperature after 6 minutes of mixing was 150° C. There was a noticeable increase in torque during the mixing as interpolymer crosslinking between BI-PMS and BR elastomers took place. A sample of this blend, prepared in accordance with the teaching of this invention, was prestained with osium tetroxide as above and then cryomicrotomed and imaged in the TEM as in Example 31 above. The photomicrograph revealed that an intimate homogeneous blend of the elastomers was produced with phase sizes much less than 1 micron and with a fairly uniform distribution of carbon black between the elastomers.

Apparently the interpolymer crosslinking which occurred during the hot mixing in the presence of zinc stearate produced a compatibilizer which enabled a stable fine phase-size blend to be produced with a fairly homogeneous distribution of the carbon black.

What is claimed is:

1. A vulcanizable, partially cured compatibilized elastomeric composition, the composition exhibiting a maximum rheometer torque increase ratio in accordance with the formula;

$\Delta M_{a+b}/(\Delta M_a f_a + \Delta M_b f_b)$ of greater than 1.25, wherein:

$\Delta M_{a+b}$=the torque increase observed for the blend of polymer (a) and polymer (b);

$\Delta M_a$=the torque increase observed for polymer (a) on its own;

$f_a$=the weight fraction of polymer (a) in the blend;

$\Delta M_b$=the torque increase observed for polymer (b) on its own; and $f_a$=the weight fraction of polymer (b) in the blend; produced by mixing:

a) a halogenated random copolymer having a number average molecular weight of at least 10,000 comprising at least about 80 weight % of polymerized isomonoolefin containing from 4 to 7 carbon atoms and from about 0.05 up to about 20 mole % of aromatic monomer units comprising a mixture of the following structures randomly distributed therein:

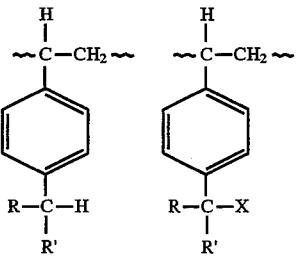

wherein R and R' are independently selected from the group consisting of hydrogen and $C_1$ to $C_4$ alkyl and X is bromine or chlorine;

b) polybutadiene or copolymers of butadiene with styrene or acryonitrile; and c) from about 0.05 to less than 3 parts by weight per 100 parts by weight of the polymer content of the mixture of a curing agent comprising a hydrocarbon soluble compound selected from the group consisting of one or a mixture of aluminum, iron, tin and zinc compounds of a carboxylic acid selected from the group consisting of naphthenic, salicylic and $C_{10}$ to $C_{28}$ fatty acids;

wherein said mixing is performed at a temperature of from about 80° C. to about 150° C. and the weight ratio of said random copolymer and unsaturated polymer present prior to mixing being within the range of about 1:99 to 99:1, said rheometer torque is measured using an oscillating disc rheometer, cure time 60 minutes at 160° C. and 3° arc.

2. The composition of claim 1 wherein said curing agent consists essentially of zinc stearate.

3. The composition of claim 2 wherein X is bromine.

4. The composition of claim 3 wherein said halogenated copolymer is a terpolymer of isobutylene, para-methylstyrene and para-bromo-methylstyrene.

5. The composition of claim 4 wherein from about 5 to about 60% of the total of the para-methylstyrene and para-bromo-methylstyrene monomer units are para-bromo-methylstyrene.

6. The composition of claim 5 wherein said terpolymer has a bromine content in the range of from about 0.1 to about 5 mole %.

7. The composition of claim 3 wherein the molar ratio of zinc stearate to benzylic bromine present in said mixture is below about 0.5.

8. The composition of claim 7 wherein said molar ratio is in the range of about 0.05 to about 0.25.

9. The composition of claim 1 wherein said curing agent is present at a level of from about 0.05 to about 2.0 parts by weight.

10. The composition of claim 1 wherein the weight ratio of said random copolymer and unsaturated polymer present in said mixture is in the range of from about 25:75 to 75:25.

11. The composition of claim 1 further containing 1 or more supplemental curatives.

12. The composition of claim 1 wherein the dispersed phase size of the polymer components of said mixture is one micron or less.

13. The vulcanizable composition of claim 1 wherein said torque increase ratio is greater than 1.5.

14. The vulcanizable composition of claim 13 wherein said torque increase ratio is greater than 2.0.

15. An intermolecularly cured elastomeric composition comprising the composition of claim 1.

16. The cured composition of claim 15 wherein said halogenated copolymer is a terpolymer of isobutylene, para-methylstyrene and para-bromo-methylstyrene.

17. The composition of claim 16 wherein from about 5 to about 60% of the total of the para-methylstyrene and para-bromo-methylstyrene monomer units are para-bromo-methylstyrene.

18. The cured composition of claim 15 wherein the weight ratio of said random copolymer and unsaturated polymer present in said mixture is in the range of from about 25:75 to 75:25.

19. A process for preparing a shaped vulcanized elastomer composition comprising:

a) mixing (i) an olefinically unsaturated polymer selected from polybutadiene or copolymers of butadiene with styrene or acrylonitrile, (ii) a halogenated random copolymer having a number average molecular weight of at least 10,000 comprising at least 80 weight % of polymerized isomonoolefin containing from 4 to 7 carbon atoms and from about 0.05 up to about 20 mole % or aromatic monomer units comprising a mixture of the following structures randomly distributed therein:

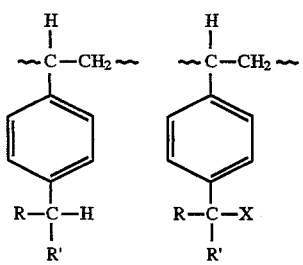

wherein R and R' are independently selected from the group consisting of hydrogen and $C_1$ to $C_4$ alkyl and X is bromine or chlorine, and (iii) from about 0.05 to less than 3 parts by weight per 100 parts by weight of the polymer content of the mixture of a curing agent comprising a hydrocarbon soluble compound selected from the group consisting of one or more of a mixture of aluminum, iron, tin and zinc compounds of a carboxylic acid selected from the group consisting of naphthenic, salicylic and $C_{10}$ to $C_{28}$ fatty acids at a temperature in the range of from about 80° C. to about 150° C. to form a partially cured uniform mixture, b) adding a curing agent comprising sulfur and zinc salts at a temperature less than vulcanization temperatures and mixing, c) shaping the mixture into a shaped article, d) subjecting the mixture to vulcanization conditions and recovering a shaped article.

20. The process of claim 19 wherein said mixing steps (a) are conducted at a temperature in the range of about 130° C. to 150° C.

21. The process of claim 19 wherein said curing agent in step (a) consists essentially of zinc stearate.

22. A shaped article prepared by the process of claim 19.

23. The cured composition of claim 19 containing at least about 10% by weight of said unsaturated polymer and mixtures there of.

24. A process for preparing a shaped vulcanized elastomer composition comprising:

a) mixing (i) a halogenated random copolymer having a number average molecular weight of at least 10,000 comprising at least about 80 weight % of polymerized isomonoolefin containing from 4 to 7 carbon atoms and from about 0.05 up to about 20 weight % of aromatic monomer units comprising a mixture of the following structures randomly distributed therein:

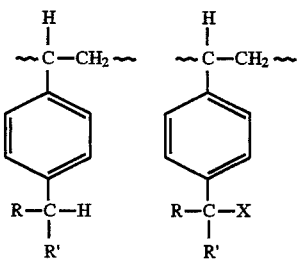

wherein K and K' are independently selected from the group consisting of hydrogen and $C_1$ to $C_4$ alkyl and X is bromine or chlorine, (ii) an olefinically unsaturated polymer selected from polybutadiene or copolymers of butadiene with styrene or acrylonitrile or mixtures thereof; and (iii) from about 0.05 to lass than 3 parts by weight per 100 parts by weight of the polymer content of the mixture era curing agent comprising a hydrocarbon soluble compound selected from the group consisting of one or a mixture of aluminum, iron, tin and zinc compounds of a carboxylic acid selected from the group consisting of naphthenic, salicylic and $C_{10}$ to $C_{28}$ fatty acids, the weight ratio of said copolymer and unsaturated polymer present being within the range about 1:99 to 99: 1, at temperatures less than about 150° C.;

b) mixing a curative into the mixture at temperatures less than the curing temperature of the unsaturated robber and the halogenated polymer;

c) shaping the mixture into an article, and d) curing the shaped material at vulcanization temperatures.

* * * * *